US012694793B2

(12) United States Patent
Naik et al.

(10) Patent No.: US 12,694,793 B2
(45) Date of Patent: Jul. 28, 2026

(54) AUTOMATED AERONAUTICAL DATA DISTRIBUTION

(71) Applicant: The Boeing Company, Arlington, VA (US)

(72) Inventors: Milind Vasudeo Naik, Frankfurt am Main (DE); Pablo Costas Álvarez, Majadahonda (ES)

(73) Assignee: Jeppesen ForeFlight, Inc., Englewood, CO (US)

( * ) Notice: Subject to any disclaimer, the term of this patent is extended or adjusted under 35 U.S.C. 154(b) by 279 days.

(21) Appl. No.: 18/479,883

(22) Filed: Oct. 3, 2023

(65) Prior Publication Data

US 2024/0119846 A1      Apr. 11, 2024

Related U.S. Application Data

(60) Provisional application No. 63/494,248, filed on Apr. 5, 2023.

(30) Foreign Application Priority Data

Oct. 10, 2022     (EP) .................................... 22382957

(51) Int. Cl.
    *G08G 5/50*        (2025.01)
    *G06F 16/25*       (2019.01)
             (Continued)

(52) U.S. Cl.
    CPC ............. *G08G 5/50* (2025.01); *G06F 16/258* (2019.01); *G08G 5/20* (2025.01); *G08G 5/34* (2025.01); *G08G 5/55* (2025.01)

(58) Field of Classification Search
    CPC ...... G06F 16/258; G06F 16/2358; G08G 5/20
    See application file for complete search history.

(56) References Cited

U.S. PATENT DOCUMENTS

2010/0185383 A1*   7/2010   Kennedy .................. G08G 5/26
                                                          345/589
2012/0221585 A1*   8/2012   Williamson .......... G06F 16/258
                                                          707/756

(Continued)

OTHER PUBLICATIONS

Dohrm et al., Fine-grained Change Detection in Structured Text Documents, 2014, DocEng'14, Sep. 16-19, 2014, Fort Collins, Colorado, USA. (Year: 2014).*

(Continued)

*Primary Examiner* — Cheyne D Ly
(74) *Attorney, Agent, or Firm* — Lathrop GPM LLP

(57)                ABSTRACT

A method automatically distributes aeronautical information. A source dataset for the aeronautical information is identified. The source dataset is in a common data format and has changes. A destination dataset for the aeronautical information is identified. The destination dataset is in the common data format. An overlap is determined between the source dataset and the destination dataset. The changes are present in the overlap between the source dataset and the destination dataset. A destination change dataset is generated in a destination format specific to the destination dataset. The destination change dataset comprises the changes present in the overlap. The destination change dataset in the destination format is sent to a destination database storing the destination dataset in the destination format.

19 Claims, 11 Drawing Sheets

(51) Int. Cl.
  *G08G 5/20* (2025.01)
  *G08G 5/34* (2025.01)
  *G08G 5/55* (2025.01)

(56) References Cited

U.S. PATENT DOCUMENTS

2013/0275940 A1* 10/2013 Park ........................ G06F 8/35
                                              717/105
2019/0012752 A1* 1/2019 Rockafellow ........... G06N 5/04

OTHER PUBLICATIONS

Wang et al., X-Diff: An Effective Change Detection Algorithm for XML Documents, Proceedings of the 19th International Conference on Data Engineering (ICDE'03), pp. 519-530. (Year: 2003).*

"X-Diff—Detecting Changes in XML Documents, (A "Different" XML Diff Tool)," Wednesday, Apr. 28, 2010, accessed Mar. 24, 2023, 1 pages. https://pages.cs.wisc.edu/~yuanwang/xdiff.html.
"Xydiff," fdintino/xydiff, copyright 2023, GitHub, Inc., released Jan. 4, 2015, accessed Mar. 24, 2023, 3 pages. https://github.com/fdintino/xydiff.
AIXM 5, "Temporality Model", Aeronautical Information Exchange Model Version 5.1, 2010, accessed Apr. 5, 2023, pp. 1-32, http://www.aixm.aero/sites/aixm.aero/files/imce/AIXM51/aixm_temporality_1.0.pdf.
PostgreSQL 8.3.23, "Genetic Algorithms", Chapter 49.2, pp. 1-2, accessed Apr. 5, 2023, https://www.postgresql.org/docs/8.3/geqo-intro2.html.
Wang et al., "X-Diff: An Effective Change Detection Algorithm for XML Documents," Proceedings 19th International Conference on Data Engineering (Cat. No. 03CH37405), Mar. 5-8, 2003, 12 pages. https://pages.cs.wisc.edu/~yuanwang/papers/xdiff.pdf.

* cited by examiner

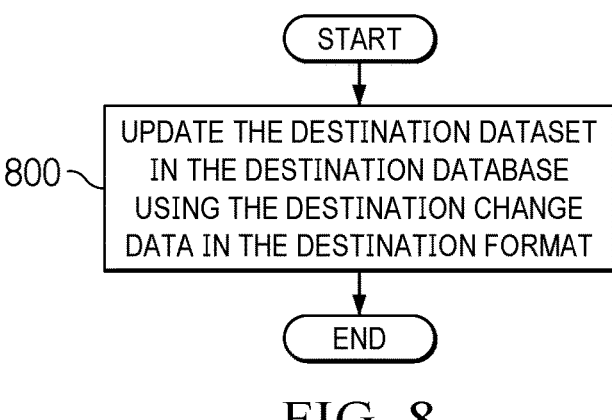

800 ~

START

UPDATE THE DESTINATION DATASET
IN THE DESTINATION DATABASE
USING THE DESTINATION CHANGE
DATA IN THE DESTINATION FORMAT

END

FIG. 8

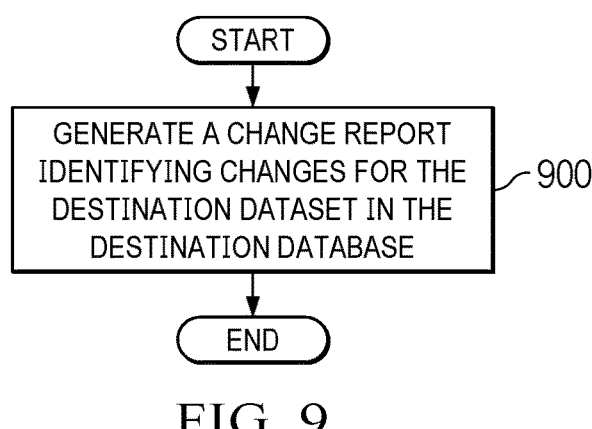

START

GENERATE A CHANGE REPORT
IDENTIFYING CHANGES FOR THE
DESTINATION DATASET IN THE
DESTINATION DATABASE

900

END

FIG. 9

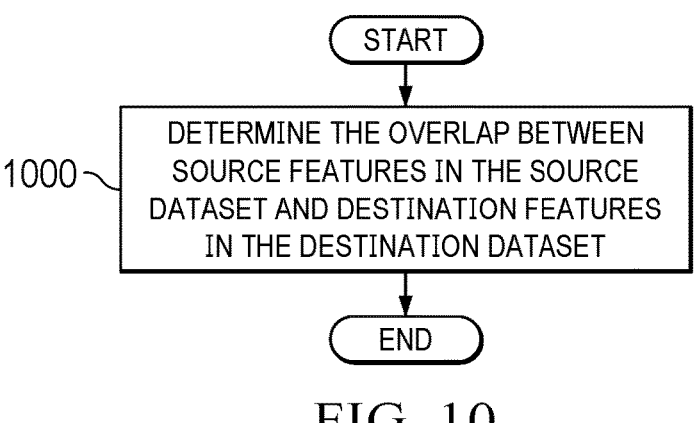

1000 ~

START

DETERMINE THE OVERLAP BETWEEN
SOURCE FEATURES IN THE SOURCE
DATASET AND DESTINATION FEATURES
IN THE DESTINATION DATASET

END

FIG. 10

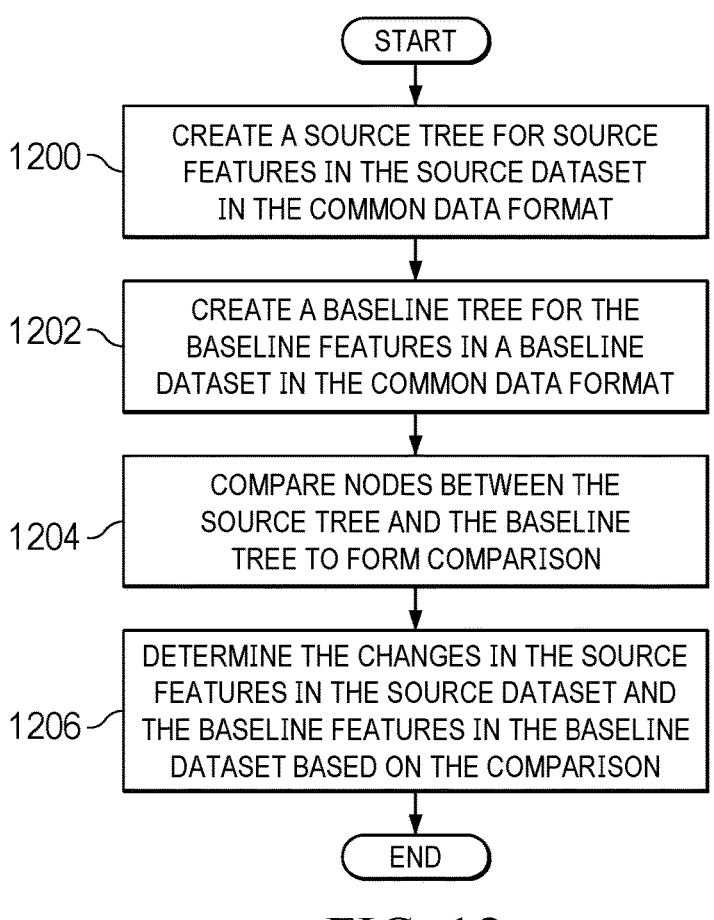

1200 — CREATE A SOURCE TREE FOR SOURCE FEATURES IN THE SOURCE DATASET IN THE COMMON DATA FORMAT

1202 — CREATE A BASELINE TREE FOR THE BASELINE FEATURES IN A BASELINE DATASET IN THE COMMON DATA FORMAT

1204 — COMPARE NODES BETWEEN THE SOURCE TREE AND THE BASELINE TREE TO FORM COMPARISON

1206 — DETERMINE THE CHANGES IN THE SOURCE FEATURES IN THE SOURCE DATASET AND THE BASELINE FEATURES IN THE BASELINE DATASET BASED ON THE COMPARISON

FIG. 12

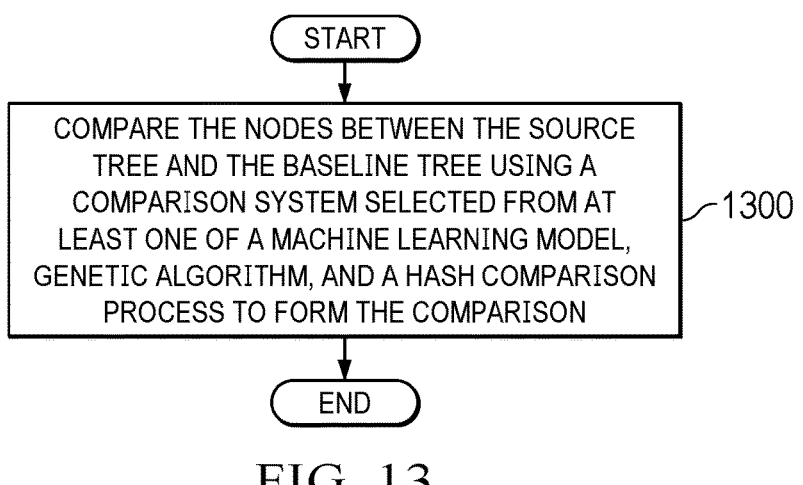

1300 — COMPARE THE NODES BETWEEN THE SOURCE TREE AND THE BASELINE TREE USING A COMPARISON SYSTEM SELECTED FROM AT LEAST ONE OF A MACHINE LEARNING MODEL, GENETIC ALGORITHM, AND A HASH COMPARISON PROCESS TO FORM THE COMPARISON

FIG. 13

AUTOMATED AERONAUTICAL DATA DISTRIBUTION

CROSS-REFERENCE TO RELATED APPLICATIONS

This application claims the benefit of U.S. Provisional Patent Application Ser. No. 63/494,248, filed Apr. 5, 2023, and entitled "Automated Aeronautical Data Distribution," and E.P. Patent Application EP22382957.3, filed Oct. 10, 2022, and entitled "Automated Environment for Aeronautical Information Services," both of which are incorporated herein by reference.

BACKGROUND INFORMATION

1. Field

The present disclosure relates generally to an improved computer system and in particular, to automated distribution of aeronautical data.

2. Background

Automation is increasingly important to providing, analyzing, and consuming aeronautical information services. As part of that increased automation, countries around the world publish flight navigation data in Aeronautical Information Publications (AIP) on a regular basis. Data is generally published on a 28-day interval known as an "AIRAC cycle," but many exceptions exist. Often data is collected from a large number different information sources. These sources can be, for example, 210 or more different information sources.

Currently, different countries publish their AIP in different electronic formats that are intended to be human-readable rather than machine-readable. These electronic formats include, for example, portable document format, comma-separated values, word processing program formats, paper-based publications, and other similar formats. In order to ingest, analyze, and distribute this information, information providers can employ hundreds of human data analysts in order to effectively load and integrate the AIP data.

Ensuring that the updates of aeronautical information are distributed with accuracy and in timely manner for use can be challenging with the large amounts of data and increasing frequency of updates of aeronautical information. Therefore, it would be desirable to have a method and apparatus that take into account at least some of the issues discussed above, as well as other possible issues. For example, it would be desirable to have a method and apparatus that overcome a technical problem with distributing updates to aeronautical information.

SUMMARY

An embodiment of the present disclosure provides a method for automated distribution of aeronautical information. A source dataset for the aeronautical information is identified. The source dataset is in a common data format and has changes. A destination dataset for the aeronautical information is identified. The destination dataset is in the common data format. An overlap is determined between the source dataset and the destination dataset. The changes are present in the overlap between the source dataset and the destination dataset. A destination change dataset is generated in a destination format specific to the destination dataset.

The destination change dataset comprises the changes present in the overlap. The destination change dataset in the destination format is sent to a destination database storing the destination dataset in the destination format.

Another embodiment of the present disclosure provides a change detection system. The change detection system comprises a computer system and a change detector. The change detector is configured to identify a source dataset for aeronautical information. The source dataset is in a common data format and has changes. The change detector is configured to identify a destination dataset for the aeronautical information. The destination dataset is in the common data format. The change detector is configured to determine an overlap between the source dataset and the destination dataset. The change detector is configured to identify the changes present in the overlap between the source dataset and the destination dataset. The change detector is configured to generate a destination change dataset in a destination format specific to the destination dataset. The destination change dataset comprises the changes present in the overlap. The change detector is configured to send the destination change dataset in the destination format to a destination database storing the destination dataset in the destination format.

Yet another embodiment of the present disclosure provides a computer program product for automated distribution of aeronautical information, the computer program product comprising a computer readable storage medium having program instructions embodied therewith. The program instructions are executable by a computer system to cause the computer system to identify a source dataset for the aeronautical information. The source dataset is in a common data format and has changes. The program instructions are executable by the computer system to cause the computer system to identify a destination dataset for the aeronautical information. The destination dataset is in the common data format. The program instructions are executable by the computer system to cause the computer system to determine an overlap between the source dataset and the destination dataset. The program instructions are executable by the computer system to cause the computer system to identify the changes present in the overlap between the source dataset and the destination dataset. The program instructions are executable by the computer system to cause the computer system to generate a destination change dataset in a destination format specific to the destination dataset. The destination change dataset comprises the changes present in the overlap. The program instructions are executable by the computer system to cause the computer system to send the destination change dataset in the destination format to a destination database storing the destination dataset in the destination format.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of a flowchart of a process for updating a dataset in accordance with an illustrative embodiment;

FIG. 9 is an illustration of a flowchart of a process for generating a change report in accordance with an illustrative embodiment;

FIG. 10 is an illustration of a flowchart of a process for determining an overlap in accordance with an illustrative embodiment;

FIG. 12 is an illustration of a flowchart of a process for identifying changes in a source dataset in accordance with an illustrative embodiment;

FIG. 13 is an illustration of a flowchart of a process for comparing nodes in accordance with an illustrative.

DETAILED DESCRIPTION

Figure 1:
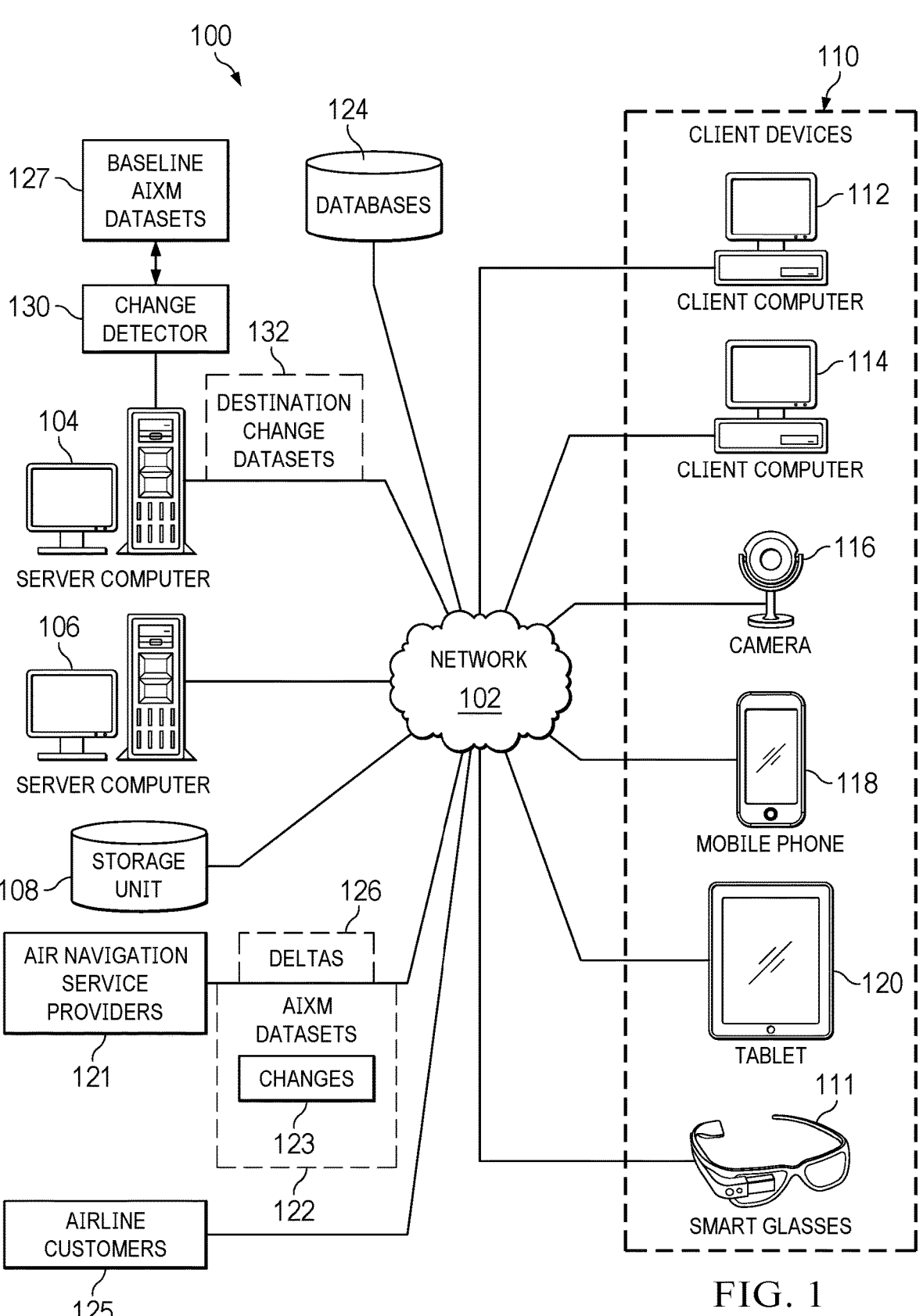
FIG. 1 is a pictorial representation of a network of data processing systems in which illustrative embodiments may be implemented.

The illustrative embodiments recognize and take into account one or more different considerations as described herein. With the large amounts of data being distributed frequently, detecting changes in aeronautical data in real time from multiple sources can be more difficult and time consuming than desired. The real time processing of aeronautical information can be difficult and infeasible with current techniques.

Aeronautical information such as navigation data and other aeronautical information can be distributed by aeronautical information providers using models the enable easier processing of the aeronautical information by computer systems. These models include Aeronautical Information Exchange Model (AIXM). These aeronautical information providers can be, for example, air navigation service providers (ANSPs).

Aeronautical information can be received from hundreds of different information sources using models such as AIXM as a standard data exchange model that is used to represent and exchange aeronautical information. This model provides a standard for describing aeronautical information. This aeronautical information can take the form of features, which can include, for example, airport infrastructure, airspace, routes, procedures, navigation aids, and other features.

AIXM describes Extensible Markup Language (XML) messages and features used to exchange information about the aeronautical data. Other models that can be used include the Flight Information Exchange Model (FIXM), the International Civil Aviation Organization Meteorological Information Exchange model (IWXXM), and other similar models. Although the illustrative examples can be described, illustrated, or described and illustrated with respect to a particular model (e.g., AIXM), the different illustrative examples can be applied to similar data exchange models.

Although AIXM is useful in providing a standard for exchanging information, different versions of AIXM are present. Different air navigation service providers have implemented different models. For example, some service providers may use AIXM while other service providers use FIXM. Additionally, service providers have implemented different versions of the same model. For example, with AIXM, some service providers use AIXM 1.0 while other service providers use AIXM 2.0.

An additional issue with the use of models is that a single version of AIXM and similar models can have relatively high complexity, particularly in terms of geometry management, feature definition, relationship between features, temporality management, XML schema implementations, complex rules, validation, data volume, etc. This relatively high complexity can increase the difficulty for an organization to consume or analyze AIPs from different data providers even with using models.

Another complexity is that aeronautical information in the datasets distributed using AIXM are comprehensive. In other words, these datasets can include more data than different consumers of the aeronautical information use.

For example, consumers such as information service providers of aeronautical information can provide specific types of information to customers such as airlines. Some providers may provide information in aviation databases that are used in route planning and operating the flight of an aircraft. Other providers may provide information in airport mapping databases that are used for ground operations.

These datasets include information used by these providers in addition to other information not used by these providers. As a result, in addition to the complexity in determining changes quickly, determining what changes in aeronautical information is relevant for a particular use can also be challenging to perform as quickly as desired to provide current information to customers such as airlines.

Thus, the illustrative examples provide a method, apparatus, system, and computer program product for automatically detecting changes in real time in source datasets from sources of aerospace information using a models such as AIXM. Additionally, the illustrative examples can accurately and quickly identify changes that are relevant for particular destinations.

In one illustrative example, a method automatically distributes aeronautical information. A source dataset for the aeronautical information is identified. The source dataset is in a common data format and has changes. A destination dataset for the aeronautical information is identified. The destination dataset is in the common data format. An overlap is determined between the source dataset and the destination dataset. The changes are present in the overlap between the source dataset and the destination dataset. A destination change dataset is generated in a destination format specific to the destination dataset. The destination change dataset comprises the changes present in the overlap. The destination change dataset in the destination format is sent to a destination database storing the destination dataset in the destination format.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 111. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage medium and downloaded to a data processing system or other device for use. For example, program instructions can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

In one illustrative example, air navigation service providers 121 can distribute AIXM datasets 122 over network 102 to databases 124. Multiple air navigation service providers such as 210 or more air navigation service providers can be present.

Databases 124 can take various forms depending on the database provider. For example, databases 124 can include at least one of a Jeppesen aviation database, an Etext database, an airport mapping database (AMDB), a MicroStation database, or other suitable databases.

A Jeppesen aviation database contains information about airports, navigation aids, airways, notices to air missions (NOTAMs), and other information. This database is available from Jeppesen, which is a subsidiary of the Boeing company. An Etext database contains information about procedures for pilots. An airport mapping database (AMDB) contains information about airports. In this example, a MicroStation database contains airport information. MicroStation is a computer-aided design software package available from Bentley Systems, Inc. These databases can be accessed by users such as airline customers 125.

In this illustrative example, as part of the process of distributing AIXM datasets 122 to databases 124, air navigation service providers 121 send AIXM datasets 122 to change detector 130 over network 102. In this illustrative example, change detector 130 converts AIXM datasets 122 from the source format such as AIXMS into a common format. In other words, AIXM datasets 122 may have different formats that meet AIXM standards. In this example, these datasets were changed into a common format for processing changes by change detector 130.

In this illustrative example, change detector 130 can be an automated process that automatically determines changes 123 in AIXM datasets 122 sent for distribution by air navigation service providers 121.

These changes can be found in the number of different ways. For example, deltas 126 can be associated with for one or more of AIXM datasets 122. For example, deltas 126 can identify changes in an AIXM dataset that have been made since the last time the dataset was distributed by particular air navigation service provider.

In another example, AIXM datasets 122 can be compared to baseline AIXM datasets 127. As depicted, baseline AIXM datasets 127 are also in the common format. A baseline AIXM dataset in baseline AIXM datasets 127 is the most recent version of a corresponding AIXM dataset in AIXM datasets 122 sent from a particular air navigation service provider in air navigation service providers 121.

With the identification of changes 123, change detector 130 can create destination change datasets 132 for distribution to databases 124. Each destination change dataset in destination change datasets 132 may have different changes depending on the content of a database in database 124 that is to receive the destination change dataset.

For example, a destination change dataset for a Jeppesen aviation database can have a different set of changes as compared to a destination change dataset for an Etext database. Additionally, these datasets are formatted using a destination format of the destination database.

Destination change datasets 132 can be implemented into databases 124 when received from change detector 130 over network 102. As result, an automatic detection of changes in distribution of changes in aeronautical information can be performed in real-time. Processing data in real-time can occur when the data is processed as quickly as possible without intentional delays. In other words, AIXM datasets 122 are processed as quickly as possible without intentional delays by change detector 130 to generate destination change datasets 132 for distribution to databases 124.

The illustration of FIG. 1 intended as an example and not meant to limit the manner in which other illustrative examples can be implemented. For example, in another illustrative example, additional processing of destination change datasets 132 can be performed prior to implementation and databases 124 for use by airline customers 125. For example, an additional validity check can be performed on one or more of destination change datasets 132. For example, although the datasets from air navigation service providers 121 are described as AIXM datasets, other types of datasets may be distributed in other similar formats processed by change detector 130. For example, the datasets can also be at least one of a Flight Information Exchange Model (FIXM), an International Civil Aviation Organization Meteorological Information Exchange model (IWXXM), or other similar models.

Figure 2:
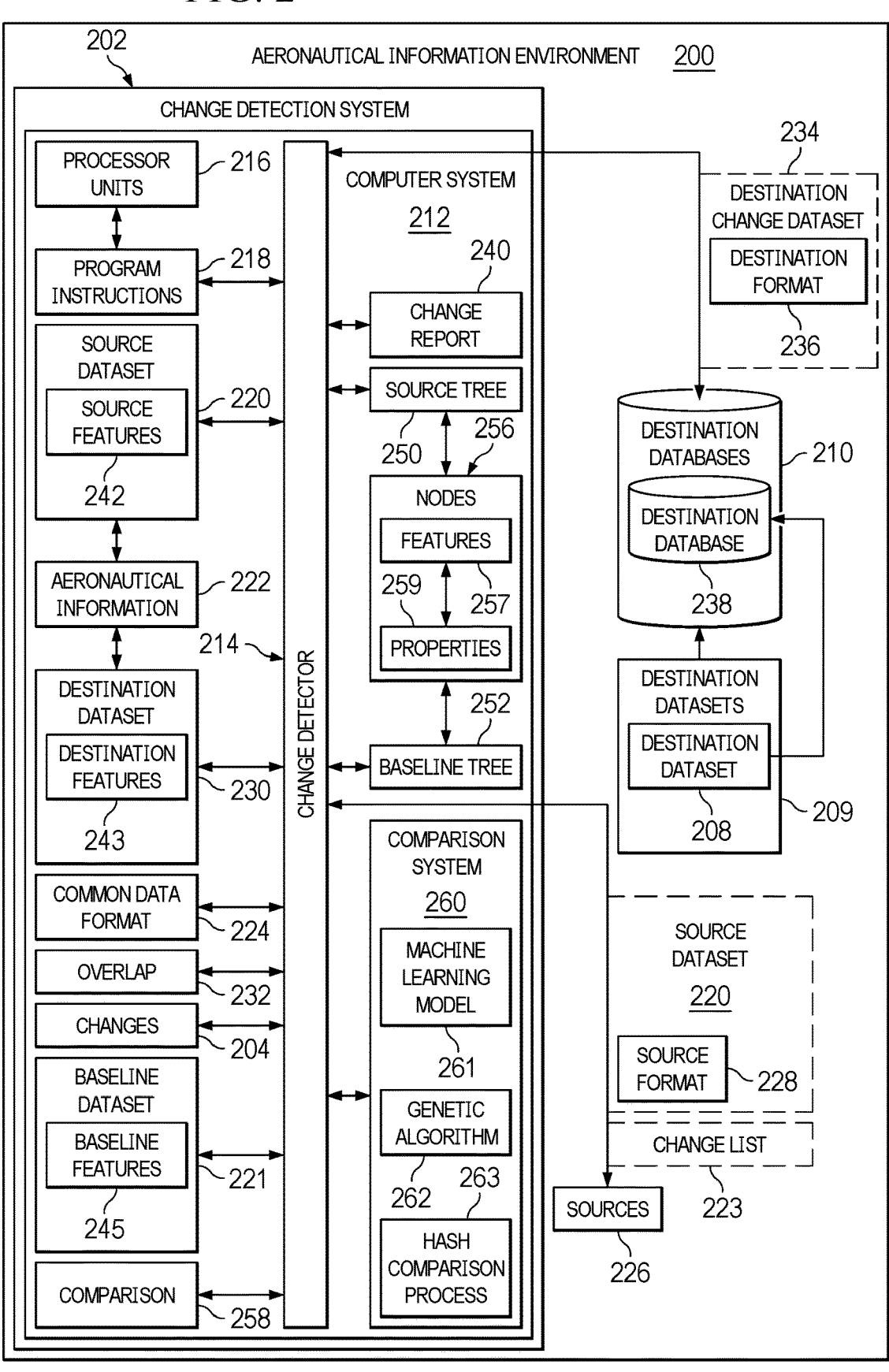
FIG. 2 is an illustration of a block diagram of an aeronautical information environment in accordance with an illustrative embodiment.

With reference now to FIG. 2, an illustration of a block diagram of an aeronautical information environment is depicted in accordance with an illustrative embodiment. In this illustrative example, aeronautical information environment 200 includes components that can be implemented in hardware such as the hardware shown in network data processing system 100 in FIG. 1.

In this illustrative example, change detection system 202 can detect changes 204 received in source dataset 220 and determine which ones of changes 204 should be distributed for implementation in destination datasets 209 in destination databases 210.

in this illustrative example, change detection system 202 comprises computer system 212 in change detector 214. Change detector 214 is located in computer system 212.

Change detector 214 can be implemented in software, hardware, firmware or a combination thereof. When software is used, the operations performed by change detector 214 can be implemented in program instructions configured to run on hardware, such as a processor unit. When firmware is used, the operations performed by change detector 214 can be implemented in program instructions and data and stored in persistent memory to run on a processor unit. When hardware is employed, the hardware may include circuits that operate to perform the operations in change detector 214.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium may be a network. The data processing systems may be selected from at least one of a computer, a server computer, a tablet, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in a computer system 212.

Further, the number of processor units 216 can be of the same type or different type of processor units. For example, a number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, change detector 214 identifies source dataset 220 for aeronautical information 222. In this example, source dataset 220 is in common data format 224 and has changes 204.

In this illustrative example, source dataset 220 is received from one of sources 226 in source format 228. As depicted, source dataset 220 in source format 228 is converted into common data format 224. For example, sources 226 can be an AIXM source that sends source datasets, such as source dataset 220 in source format such as an AIXM format. In another example, these sources can send source datasets in other formats that follow models such as Information Exchange Model (FIXM), International Civil Aviation Organization Meteorological Information Exchange model (IWXXM), or other similar models.

In this illustrative example, these formats can define the manner in which data in the datasets are stored in data structures. In other words, the different models can define the manner in which the data in a dataset is stored in a data structure. In these illustrative examples, the datasets in the different formats can be stored in data structures.

Sources 226 are aeronautical information data providers. These data providers can be, for example, air navigation service providers (ANSPs) or other types providers of aeronautical information 222.

In this example, source dataset 220 is changed from source format, such as AIXM, to common data format 224. The use of common data format 224 reduces the complexity forming comparisons, conversions, and other manipulations of datasets by change detector 214. For example, changes 204 in source dataset 220 can be determined by comparing source dataset 220 with baseline dataset 221. This example, both datasets are in common data format 224 making the comparison between the datasets easier and less complex.

In one illustrative example, change detector 214 creates source tree 250 for source features 242 in source dataset 220 in common data format 224. Change detector 214 creates baseline tree 252 for baseline features 245 in baseline dataset 221 in common data format 224. As depicted, source tree 250 and baseline tree 252 comprise nodes 256. These nodes can be connected to each other based on relationships or dependencies and represent features 257 and properties 259 for features 257.

In this illustrative example, a feature is a collection of data organized and arranged as a structured dataset. A feature can be a spatial object such an airport runway, a taxiway, an air traffic control tower, an airspace sector, a navigation aid, an airspace, a procedure, a route, a navaid, a route, a restriction, a navaid component, an airport-heliport, a significant point, a runway, a holding pattern, and other spatial objects. In the illustrative examples, a property can be an attribute or some other characteristic of the feature. For example, if the feature is a runway, a property can be a length, the width, and location, or other characteristics or attributes of the runway.

With these two trees, change detector 214 can compare nodes 256 between source tree 250 and baseline tree 252 to form comparison 258. This comparison can include identifying changes between source tree 250 and baseline tree 252. For example, a determination can be made as to whether information corresponding nodes in the trees have changed. Further, the comparison can determine whether the changes occurred with the addition or deletion of a node in nodes 256. Another change can be a change in dependency between two or more nodes 256.

Change detector 214 uses this comparison to determine changes 204 to source features 242 in source dataset 220 and baseline features 245 in baseline dataset 221 based on comparison 258.

In this example, this comparison can be performed in a number of different ways. For example, nodes 256 between source tree 250 and baseline tree 252 can be compared using comparison system 260 selected from at least one of a machine learning model 261, genetic algorithm 262, a hash comparison process 263 or other suitable processes to form comparison 258.

This example, machine learning model 261 is a type of artificial intelligence model that can learn without being explicitly programmed. A machine learning model can learn based training data input into the machine learning model. The machine learning model can learn using various types of machine learning algorithms. The machine learning algorithms include at least one of a supervised learning, and unsupervised learning, a feature learning, a sparse dictionary learning, an anomaly detection, a reinforcement learning, a recommendation learning, or other types of learning algorithms. Examples of machine learning models include an artificial neural network, a convolutional neural network, a decision tree, a support vector machine, a regression machine learning model, a classification machine learning model, a random forest learning model, a Bayesian network, a genetic algorithm, and other types of models. These machine learning models can be trained using data and process additional data to provide a desired output.

In this example, machine learning model 261 can be trained to compare features and properties in trees such as source tree 250 and baseline tree 252 to determine differences used to identify changes 204.

Genetic algorithm 262 is a search based optimization technique in which potential solutions can be generated randomly. In other words, this type of comparison technique performs a nondeterministic, randomized search between source tree 250 and baseline tree 252 to compare nodes 256 between the trees. This technique can be used to compare nodes 256 between source tree 250 and baseline tree 252. In some illustrative examples, genetic algorithm 262 can be implemented as a machine learning model.

Hash comparison process 263 can generate patches of different nodes in nodes 256 between source tree 250 and baseline tree 252. These hashes can be compared hashes to determine whether differences are present. In this example, the hashes can be made for corresponding nodes between source tree 250 and baseline tree 252.

In other illustrative examples, changes 204 can be determined using change list 223. Change list 223 can be received from the source in sources 226 distributing source dataset 220 and identifies changes 204 since the last distribution of source dataset 220.

In this illustrative example, change detector 214 identifies destination dataset 230 for aeronautical information 222. In this example, destination dataset 230 is in the common data format 224. In other words, both source dataset 220 and destination dataset 230 are structured using common data format 224.

In this illustrative example, change detector 214 determines overlap 232 between aeronautical information 222 in source dataset 220 and aeronautical information 222 in destination dataset 230. Change detector 214 identifies changes 204 in aeronautical information 222 present in overlap 232 between source dataset 220 and destination dataset 230. In this illustrative example, the overlap can be for source features 242 in source dataset 220 and destination features 243 in destination dataset 230.

In response to determining changes 204 in aeronautical information 222 present in overlap 232, change detector 214 generates destination change dataset 234 in destination format 236. In this example, destination format 236 is a format that is specific to destination dataset 230 in contrast to using common data format 224. Destination dataset 230 stored in destination database 238 is in destination format 236. In this example, destination change dataset 234 comprises changes 204 present in overlap 232.

Change detector 214 sends destination change dataset 234 in destination format 236 to destination database 238 storing destination dataset 208 in the destination format 236. Change detector 214 updates destination dataset 208 in destination database 238 using destination change dataset 234 in destination format 236. This update of destination dataset 208 in destination database 238 can occur automatically with destination database 238 receiving destination change dataset 234. In some illustrative examples, change detector 214 can include or send commands and instructions along with destination change dataset 234 in destination format 236 sent to destination database 238.

Additionally, change detector 214 can create change report 240 identifying changes for destination change dataset 234 in destination database 238. This report identifies changes that are present in destination change dataset 234 in destination database 238.

In one illustrative example, one or more technical solutions are present that overcome a technical problem with updating aeronautical information received from various sources for distribution databases over a network. Computer system 212 can be configured to perform at least one of the steps, operations, or actions described in the different illustrative examples using software, hardware, firmware or a combination thereof. As a result, computer system 212 operates as a special purpose computer system in which change detector 214 in computer system 212 enables performing change detection between datasets containing aeronautical information in real time. In this illustrative example, change detector 214 transforms computer system 212 into a special purpose computer system can automatically detect changes between datasets received for distribution and determine what changes should be distributed to different databases as compared to currently available general computer systems that do not have change detector 214.

In the illustrative example, the use of change detector 214 in computer system 212 integrates processes into a practical application for operations distributing aeronautical information in a standard usable by different databases increases the performance of computer system 212. In other words, change detector 214 in computer system 212 is directed to a practical application of processes integrated into change detector 214 in computer system 212 that enables identifying and overlap between a source dataset and one or more target datasets to identify what changes should be distributed to databases story of the different datasets. In the illustrative examples, change detector 214 can perform at least one of the automatic conversion of formats for processing datasets. Further, change detector 214 can also perform comparisons automatically creating trees representing the datasets for analysis to determine changes between those datasets.

The illustration of aeronautical information environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a network is present in aeronautical information environment 200 although not shown. In the illustrative examples, the communications made between change detector 214 and destination databases 210 and sources 226 can occur over a network. This network can be, for example, at least one of an Internet, an intranet, a local area network, a wide area network, or some other suitable type of network.

As another example, one or more source datasets in addition to source dataset 220 can be received by change detector 214 from sources 226 for automatic real-time processing. Further, although destination databases 210 is shown as a single component in the figure, destination databases 210 can be distributed in different geographic location. These destination databases can be maintained by different entities to provide information and services to customers such as airlines.

Figure 3:
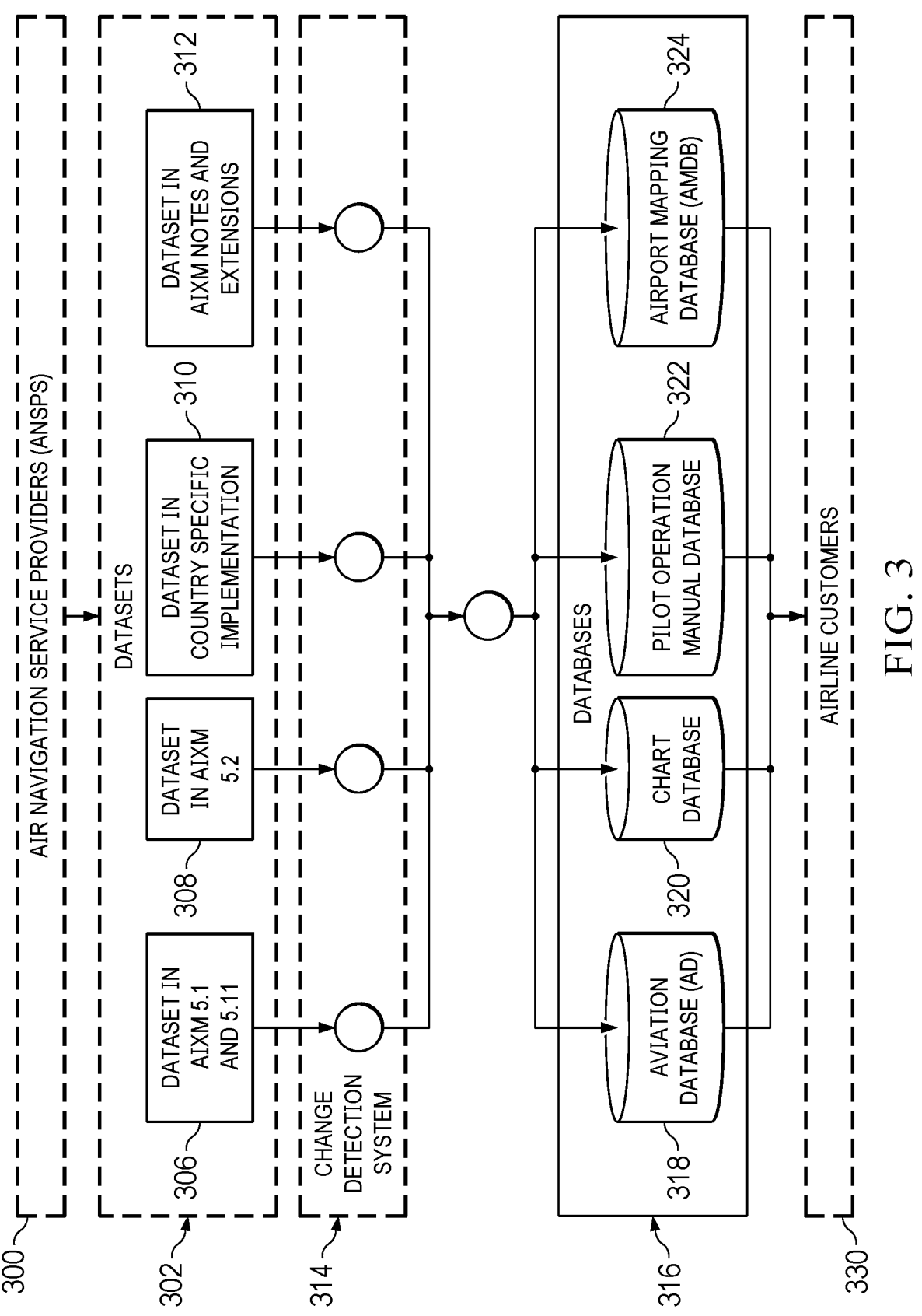
FIG. 3 is an illustration of dataflow for distributing aeronautical information in datasets in accordance with an illustrative embodiment.

With reference to FIG. 3, an illustration of dataflow for distributing aeronautical information in datasets is depicted in accordance with an illustrative embodiment. As depicted, air navigation service providers (ANSPs) 300 generate and distribute aeronautical information in datasets 302. In this example, these datasets have formats that meet AIXM standards. For example, datasets 302 can include dataset 306 in AIXM 5.1 and 5.11, dataset 308 in AIXM 5.2, dataset 310 in country specific AIXM implementation, and dataset 312 in AIXM notes and extensions.

These datasets are received by change detection system 314. Change detection system 314 can be implemented using change detection system 202 in FIG. 2. In this illustrative example, change detection system 314 automatically detects changes in datasets 302. These changes can be detected by comparing the datasets with baseline datasets in one illustrative example. In another illustrative example, datasets 302 can include change lists that describe changes in datasets 302. In other words, these change lists can describe what features have changed within particular datasets.

In this illustrative example, change detection system 314 determines what changes are relevant to particular databases in databases 316. As depicted, databases 316 include aviation database 318, chart database 320, pilot operation manual database 322, and airport mapping database 324. These databases contain different features in the aeronautical information in datasets 302.

Change detection system 314 determines an overlap between a dataset received for distribution in datasets 302 and a destination dataset in one of databases 316. In other words, change detection system 314 determines what features in a dataset are present in a destination dataset in databases 316. These features that are common to both the source dataset and the destination dataset are overlapping features. The overlap between these features is used to determine what changes from datasets 302 are sent to particular databases and databases 316.

In these illustrative examples, change detection system 314 automatically processes datasets 302 to identify changes, what changes are relevant to different data sets and databases 316, and distribute these changes to databases 316. As a result, changes for features relevant to each of databases 316 are sent to those databases.

As depicted, databases 316 are accessed by airline customers 330. An ability to quickly access up-to-date information is important to these current systems. Change detection system 314 can perform this processing automatically in real time to provide airline customers 330 with aeronautical information that is timely and accurate. For example, changes to airspace restrictions may occur periodically. With change detection system 314, these changes can be distributed to the appropriate databases and databases 316 automatically processed in real time as the changes are received in datasets 302.

Figure 4:
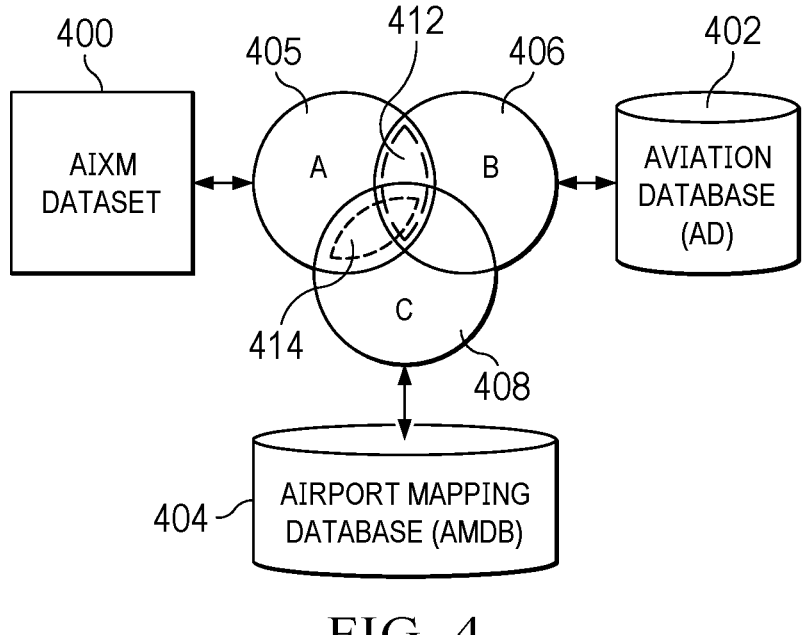
FIG. 4 is an illustration of overlaps for determining change data for distribution in change datasets in accordance with an illustrative embodiment.

Turning next to FIG. 4, an illustration of overlaps for determining change data for distribution in change datasets is depicted in accordance with an illustrative embodiment. In this illustrative example, AIXM dataset 400 is a source dataset containing changes for distribution. As depicted, these changes can be distributed to aviation database 402 and airport mapping database 404. As depicted, features with changes in AIXM dataset 400 are represented by region A 405.

In this illustrative example, aviation database 402 provides information used for flight planning, navigation, and other purposes. This information can include, for example, airport information, airspace information, navigation information, weather information, terrain and other information.

This information is represented as features in aviation database 402. These features are represented by region B 406.

Airport mapping database (AMDB) 404 contains airport moving maps, information about runways, taxiways, gates, parking, healing, maintenance, and other structures or items at an airport. This information is represented by features as shown in region C 408.

In this example, AIXM dataset 400 is a comprehensive dataset. In other words, AIXM dataset 400 includes aeronautical information that expands beyond the type of aeronautical information used by aviation database 402 and airport mapping database 404. As result, all of the changes in AIXM dataset 400 may not be needed to update the datasets in these databases in this illustrative example.

As depicted, some aeronautical information may overlap between aviation database 402 and airport mapping database 404. In this example, region B 406 represents features in aviation database 402; and region C 408 represents features in airport mapping database 404.

In this illustrative example, not all of the changes in the AIXM dataset 400 represented in region A 405 are to be distributed to both databases. The particular changes distributed to the databases depend on what features are present in aviation database 402 and airport mapping database 404 have changes.

As depicted, the changes in features in AIXM dataset 400 to be distributed to these databases can be based on the overlap between the features in AIXM dataset 400 and the features in the databases. For example, overlap 412 is present between region A 405 and region B 406. The changes in features in AIXM dataset 400 in this region are the changes that are sent to aviation database 402. In this example, overlap 414 is present between region A 405 and region C 408 and identifies the changes in AIXM dataset 400 that are to be distributed to airport mapping database 404. In this example, overlap 412 and overlap 414 are examples of overlap 232 in FIG. 2.

Figure 5:
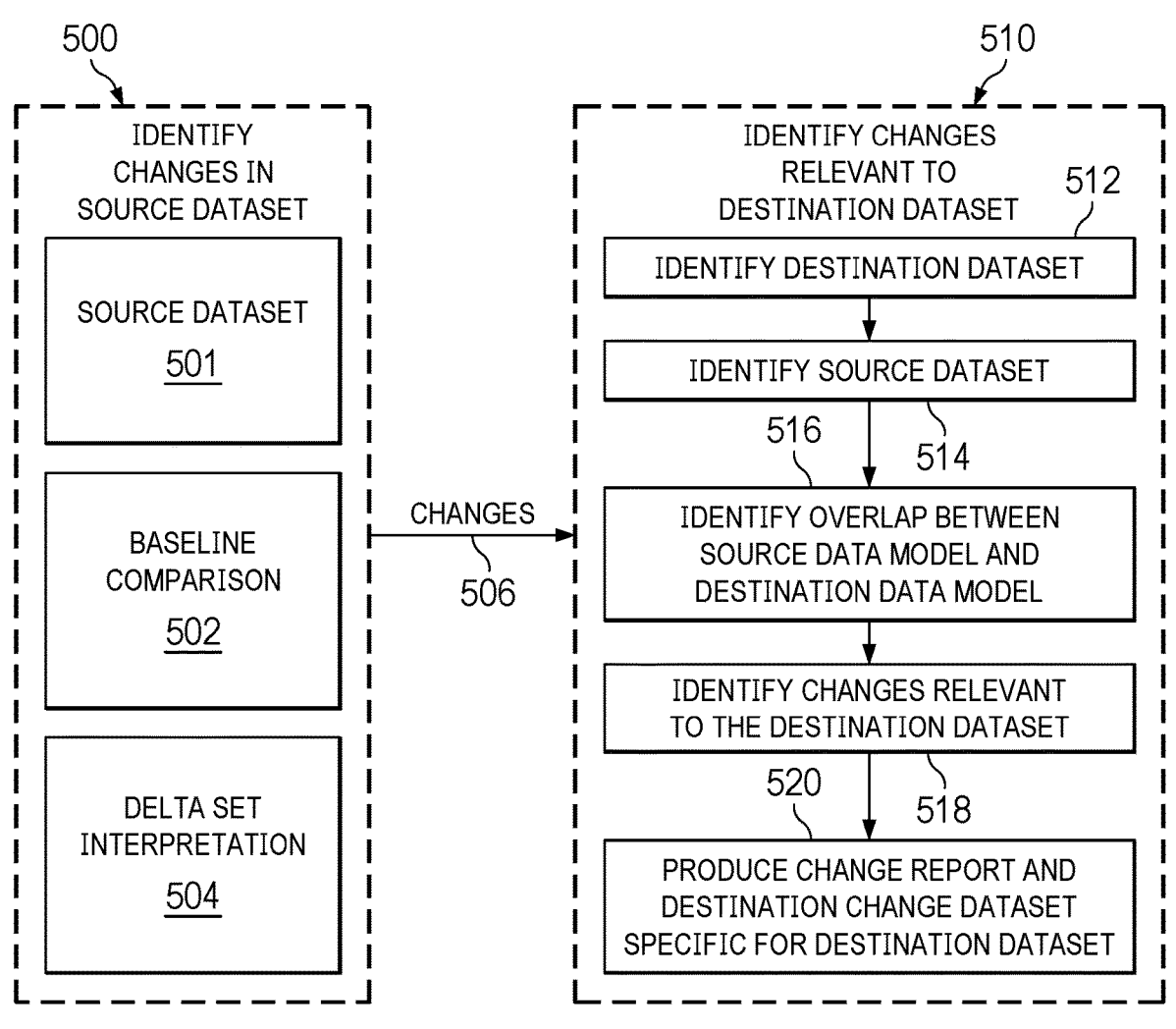
FIG. 5 is an illustration of a process flow for determining changes for distribution to a destination dataset in accordance with an illustrative embodiment.

With reference now to FIG. 5, an illustration of a process flow for determining changes for distribution to a destination dataset is depicted in accordance with an illustrative embodiment. In this illustrative example, this process flow can be implemented in change detector 214 in change detection system 202 in FIG. 2. This process flow can also be implemented by change detection system 314 in FIG. 3.

In this illustrative example, the process flow begins by identifying changes in source dataset 501 (block 500). These changes can be identified by performing baseline comparison 502 or delta set interpretation 504.

Baseline comparison 502 involves comparing source dataset 501 with a baseline dataset. The baseline dataset is a previous version of the source dataset prior to changes made to the source dataset 501. Delta set interpretation 504 is performed using a change list for list of deltas for the source dataset having the changes.

In this manner, changes 506 can be identified for the source dataset. With these changes, the process flow identifies changes 506 that are relevant to the destination dataset (block 510). In block 510 the process flow identifies the destination dataset (block 512). This destination dataset is the dataset for which changes are to be identified and sent. The process identifies the source dataset (block 514). In block 512 and block 514, these datasets are converted to a common data format.

The process identifies an overlap between the source dataset and the destination dataset (block 516). This overlap identifies features in the source dataset that are also present in the destination dataset.

The process identifies changes 506 that are relevant to the destination dataset (block 518). The process produces a change report and destination change dataset that is specific for the destination dataset (block 520). This change report and destination change dataset produced in block 520 can be distributed to the database containing the destination dataset.

In this illustrative example, the operations in block 512, block 514, and block 516 can be performed once. These operations do not need to be performed again when new changes are received for source dataset 501 unless a change in change is present in the features used in the destination dataset for the source dataset.

Figure 6:
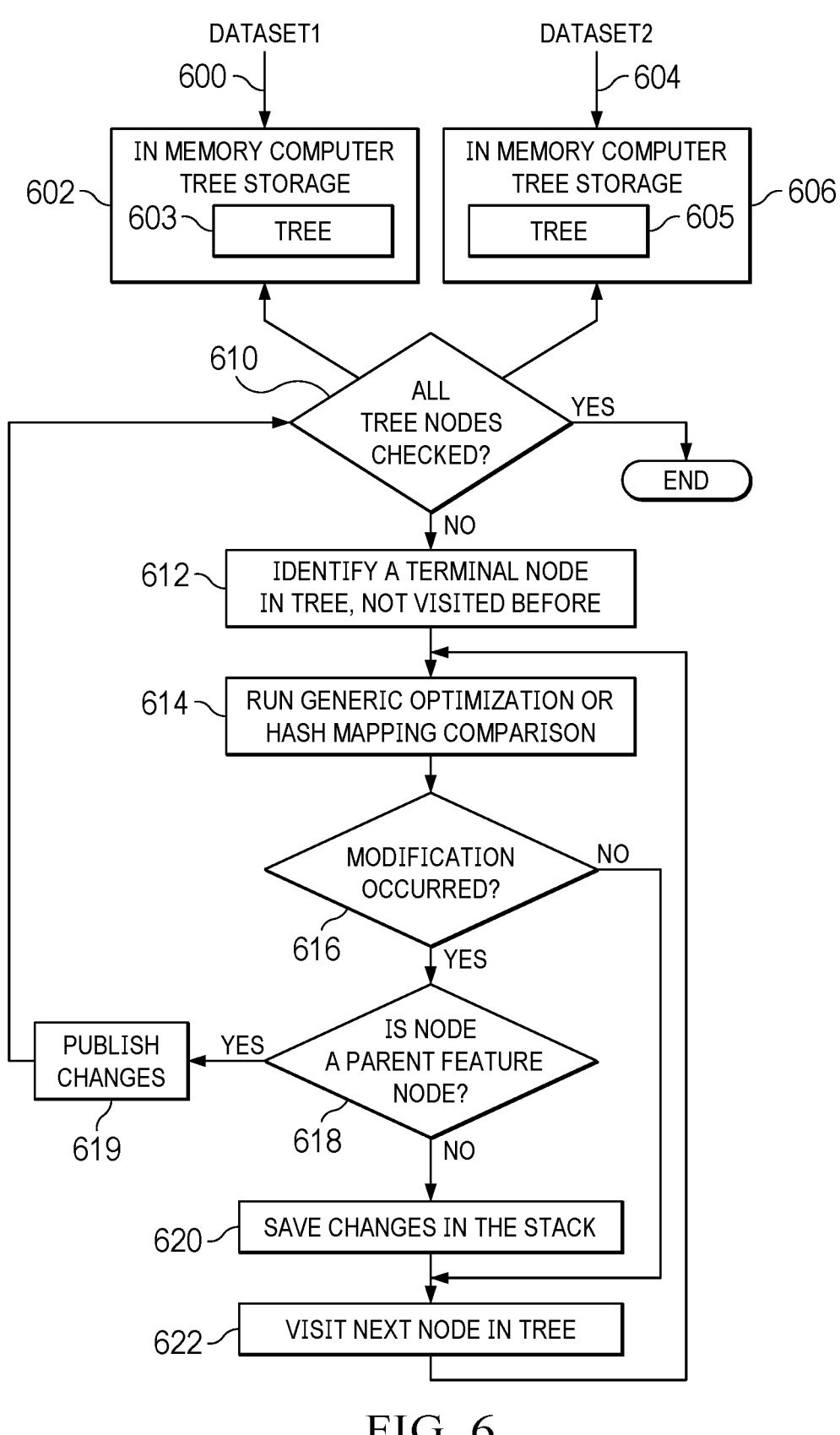
FIG. 6 is an illustration of a process flow for comparing datasets in accordance with an illustrative limit.

Turning now to FIG. 6, an illustration of a process flow for comparing datasets is depicted in accordance with an illustrative limit. The process in Figure F1 can be implemented in hardware, software, or both. When implemented in software, the process can take the form of program instructions that are run by one of more processor units located in one or more hardware devices in one or more computer systems. In this illustrative example, the process flow illustrated in this figure can be implemented by change detector 214 in computer system 212. This process can also be implemented by change detection system 314 in FIG. 3.

With the massive amounts of data and the complexity of the data in datasets received from aeronautical information data providers, the comparison of the data can be difficult without organizing the data into a form that is efficient for analysis. In these illustrative examples, the data in these datasets can be organized into trees in which nodes can represent features and properties of the features. For example, a feature can be a runway and properties of the runway can be dimensions, orientation, and location of the runway.

In this example, dataset 1 600 is processed to generate tree 603 representing information in dataset 1 600 that is placed in in memory computer tree storage 602. Dataset 2 604 is processed to generate tree 605 representing information and dataset 2 604 that is placed in in memory computer trees storage 606. For example, dataset 1 600 can be a source dataset with changes. Dataset 2 602 can be a baseline dataset for the source dataset prior to the changes made in the source dataset.

In this illustrative example, each of these datasets can be comprised of AIXM files that can be converted to a common format such as an XML format. These XML files can be used to build the trees in the in memory computer tree storage as depicted. Each entry has a parent node representing a data identifier and a second level of nodes comprising data features. Additional nodes for properties also can be present that are connected to the nodes for the data features.

These trees can provide an ability to organize complex relationships between features and properties in these datasets. For example, a parent feature node in the tree can be AirportHeliport. This parent feature node can have other features that are child nodes to this parent feature node. For example, child feature nodes can include for example, altimeter source, organization, airport hotspot, and survey control point. Properties for AirportHeliport can be, for example, city, contact information, and other properties or the airport field AirportHeliport. These child nodes can also include properties. For example, altimeter source can have an altimeter source status as an object. That object can reference another object such as schedule.

Additionally, interdependencies can be present between properties. The complexity of these interdependencies can depend on the particular model used in a dataset.

The process flow determines whether all of the tree nodes have been checked in tree 603 (block 610). If all of the nodes in the trees have been checked, the process flow terminates. Otherwise, the process flow identifies a terminal node in tree 603 that has not been visited before (block 612). The process flow runs a genetic optimization or HASH mapping comparison between the terminal node identified in tree 603 and a corresponding terminal in tree 605 (block 614). The genetic optimization is an example of genetic algorithm 262 in FIG. 2. The nondeterministic randomized search performed using genetic optimization can provide increased performance as compared to currently used techniques with large amounts of data. This type of technique is capable of handling an exponential explosion of a search space that can be present with datasets containing aeronautical information received from various sources.

The hash mapping comparison is an example of hash comparison process 263 in FIG. 2. This type of comparison also can provide an ability to increase performance in comparing the trees with large amounts of data such as those found in datasets containing aeronautical information. Both of these techniques can be used to recursively visit the dependency of features in the dataset.

The process determines whether a modification occurred from the comparison (block 616). A result of the of the comparison in block 616 can take a number different forms. For example, one result can be no change between the two nodes. In another example, the result can be a change is present between the nodes being compared.

This change can take a number of different forms. For example, the change can be a change of data in the node, a reference change, a change in reference data, an addition of a node, a deletion of a node, or other changes. In this example, the change of a reference can be a waypoint can be changed from one waypoint to another waypoint. For example, a child waypoint can be removed and another new way point can be added as a child.

If a modification is identified between the nodes, the process determines whether the node is a parent feature node (block 618). In this block, a determination is made as to whether all of the nodes relating to a parent feature node have been processed. This node is a top level node in a branch for the dataset. In these illustrative examples, a root node for the dataset is located above the parent feature node.

If the node is a parent feature node, the process flow publishes the change (block 619). In this example, the process publishes the changes by including the changes in the destination change dataset.

Other examples of features that can be a parent feature node in a tree include a navaid, a route a restriction, a Navaid Component, a SignificantPoint, a runway, a holding pattern, an airspace, and other types of aeronautical elements.

The process flow then returns to block 610. In this case, to determine whether another branch in the tree is present for processing.

If the node is not a parent feature node in block 618, the process flow saves the changes in a stack (block 620). In block 620, the stack is a data structure and can be in a location computer memory where data can be stored on a temporary basis. The process flow visits the next node in tree 603 (block 622). The process flow then returns to block 614.

In addition, once the changes identified between the source dataset with changes and the baseline dataset. For example, dataset 1 600 can be the changes identified in the first comparison and processed to generate tree 603. With this example, dataset 2 604 can be a destination dataset. In this example, both datasets are in a common format and process to generate tree 603 and tree 605 for comparison.

The dataset with identified changes can be processed to generate a tree with nodes having labels in addition to the information in the dataset. These labels can be, for example, no change, change of data, change of reference, change of referenced data, add, or delete. This process flow can be used to identify what changes are relevant for a destination dataset using the dataset with these labels for features and properties in the dataset. As a result, the comparison between nodes can be used to determine whether nodes in tree 603 for the source dataset have corresponding nodes in tree 605 for the destination dataset.

In this manner, an overlap between the datasets can be identified through comparison of nodes in the trees. With this identification, changes in nodes in the overlap can be identified for use in generating a destination change dataset for use in updating the destination dataset.

As a result, the change detector implementing the process flow in FIG. 6 can perform change detection between two datasets provided by a source. For example, the two datasets can be a new dataset with updates and approach dataset that is a baseline for comparison. Additionally, this process flow can also be used to detect the change between a new dataset received from a source and a destination dataset.

In another illustrative example, the new dataset from the source can be compared directly to the destination dataset to determine the overlap and whether changes are present in the overlap.

Figure 7:
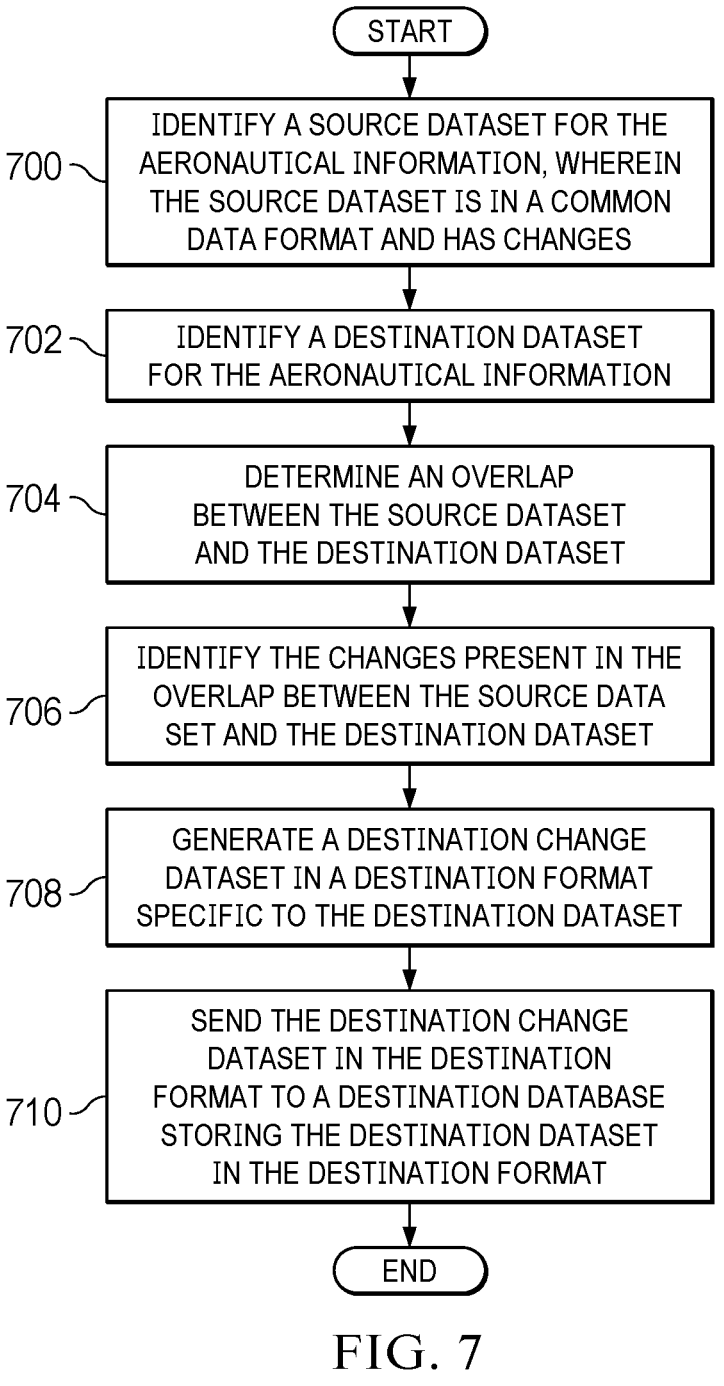
FIG. 7 is an illustration of a flowchart of a process for automated distribution of aeronautical information in accordance with an illustrative embodiment.

Turning next to FIG. 7, an illustration of a flowchart of a process for automated distribution of aeronautical information is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in change detector 214 in computer system 212 in FIG. 2. This process can also be implemented by change detection system 314 in FIG. 3.

The process begins by identifying a source dataset for the aeronautical information, wherein the source dataset is in a common data format and has changes (operation 700). In operation 700, the source dataset is in a common data format and has changes.

The process identifies a destination dataset for the aeronautical information (operation 702). In operation 702, the destination dataset is in the common data format.

The process determines an overlap between the source dataset and the destination dataset (operation 704). The process identifies the changes present in the overlap between the source dataset and the destination dataset (operation 706).

The process generates a destination change dataset in a destination format specific to the destination dataset (operation 708). In operation 708, the destination change dataset comprises the changes present in the overlap. The process sends the destination change dataset in the destination format to a destination database storing the destination dataset in the destination format (operation 710). The process terminates thereafter.

With reference to FIG. 8, an illustration of a flowchart of a process for updating a dataset is depicted in accordance with an illustrative embodiment. The process illustrated in FIG. 8 is an example of an additional operation that can be performed with the operations in FIG. 7.

The process updates the destination dataset in the destination database using the destination change data in the destination format (operation 800). The process terminates thereafter.

Next in FIG. 9, an illustration of a flowchart of a process for generating a change report is depicted in accordance with an illustrative embodiment. The process illustrated in FIG. 9 is an example of an additional operation that can be performed with the operations in FIG. 7.

The process generates a change report identifying changes for the destination dataset in the destination database (operation 900). The process terminates thereafter.

Turning to FIG. 10, an illustration of a flowchart of a process for determining an overlap is depicted in accordance with an illustrative embodiment. The process illustrated in FIG. 10 is an example of an implementation for operation 704 in FIG. 7.

The process determines the overlap between source features in the source dataset and destination features in the destination dataset (operation 1000). The process terminates thereafter.

Figure 11:
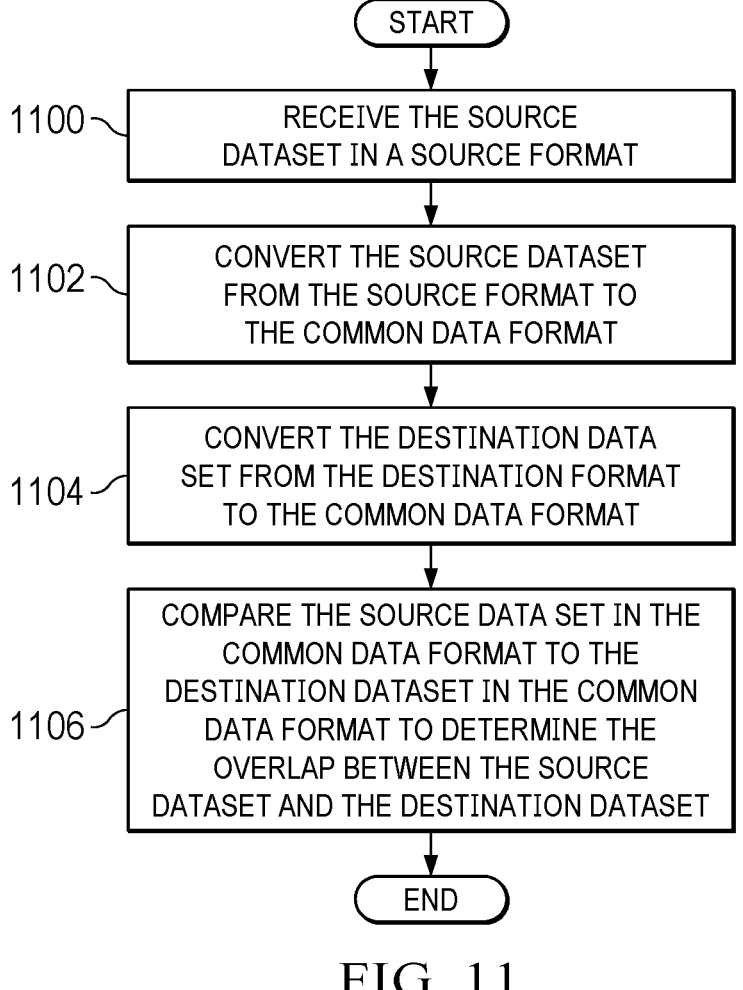
FIG. 11 is an illustration of a flowchart of a process for determining an overlap in accordance with an illustrative embodiment.

Next in FIG. 11, an illustration of a flowchart of a process for determining an overlap is depicted in accordance with an illustrative embodiment. The process illustrated in FIG. 11 is an example of an implementation for operation 704 in FIG. 7.

The process begins by receiving the source dataset in a source format (operation 1100). The process converts the source dataset from the source format to the common data format (operation 1102). The process converts the destination dataset from the destination format to the common data format (operation 1104).

The process compares the source dataset in the common data format to the destination dataset in the common data format to determine the overlap between the source dataset and the destination dataset (operation 1106). The process terminates thereafter.

With reference now to FIG. 12, an illustration of a flowchart of a process for identifying changes in a source dataset is depicted in accordance with an illustrative embodiment. The process in FIG. 7 can be implemented in hardware, software, or both. When implemented in software, the process can take the form of program instructions that are run by one or more processor units located in one or more hardware devices in one or more computer systems. For example, the process can be implemented in change detector 214 in computer system 212 in FIG. 2. This process can also be implemented by change detection system 314 in FIG. 3.

The process begins by creating a source tree for source features in the source dataset in the common data format (operation 1200). The process creates a baseline tree for the baseline features in a baseline dataset in the common data format (operation 1202).

The process compares nodes between the source tree and the baseline tree to form comparison (operation 1204). The process determines the changes in the source features in the source dataset and the baseline features in the baseline dataset based on the comparison (operation 1206). The process terminates thereafter.

Turning now to FIG. 13, an illustration of a flowchart of a process for comparing nodes is depicted in accordance with an illustrative. The process illustrated in this figure is an example of an implementation for operation 1204 in FIG. 12.

The process compares the nodes between the source tree and the baseline tree using a comparison system selected from at least one of a machine learning model, genetic algorithm, and a hash comparison process to form the comparison (operation 1300). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
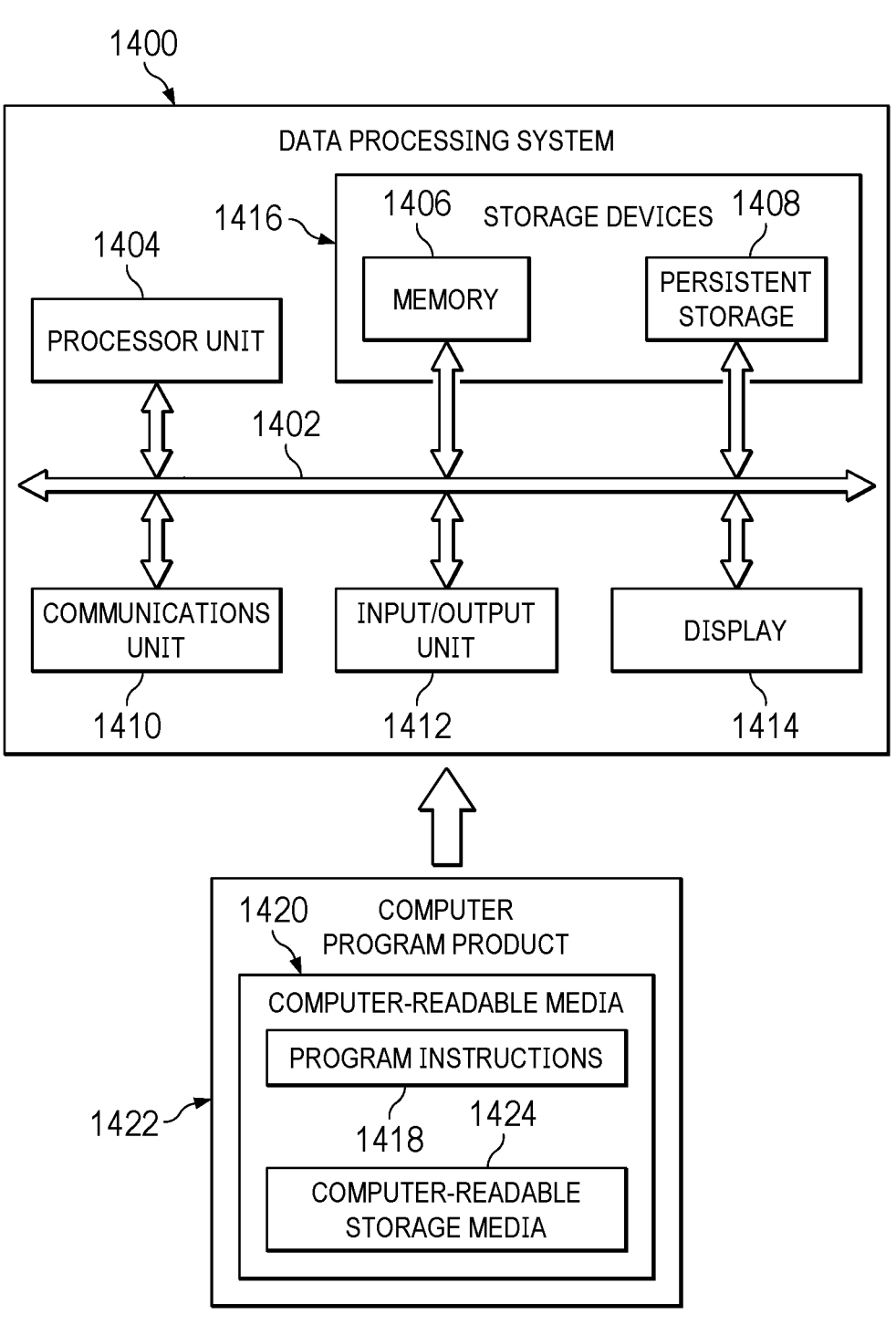
FIG. 14 is an illustration of a block diagram of a data processing system in accordance with an illustrative embodiment.

Turning now to FIG. 14, a block diagram of a data processing system is depicted in accordance with an illustrative embodiment. Data processing system 1400 can be used to implement server computer 104, server computer 106, client devices 110, in FIG. 1. Data processing system 1400 can also be used to implement computer system 212. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices

1416 may also be referred to as computer readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program instructions, computer usable program instructions, or computer readable program instructions that can be read and executed by a processor in processor unit 1404. The program instructions in the different embodiments can be embodied on different physical or computer readable storage media, such as memory 1406 or persistent storage 1408.

Program instructions 1418 are located in a functional form on computer readable media 1420 that is selectively removable and can be loaded onto or transferred to data processing system 1400 for execution by processor unit 1404. Program instructions 1418 and computer readable media 1420 form computer program product 1422 in these illustrative examples. In the illustrative example, computer readable media 1420 is computer readable storage media 1424.

Computer readable storage media 1424 is a physical or tangible storage device used to store program instructions 1418 rather than a medium that propagates or transmits program instructions 1418. Computer readable storage media 1424 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer readable storage media 1424, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1418 can be transferred to data processing system 1400 using a computer readable signal media. The computer readable signal media are signals and can be, for example, a propagated data signal containing program instructions 1418. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1420" can be singular or plural. For example, program instructions 1418 can be located in computer readable media 1420 in the form of a single storage device or system. In another example, program instructions 1418 can be located in computer readable media 1420 that is distributed in multiple data processing systems. In other words, some instructions in program instructions 1418 can be located in one data processing system while other instructions in program instructions 1418 can be located in one data processing system. For example, a portion of program instructions 1418 can be located in computer readable media 1420 in a server computer while another portion of program instructions 1418 can be located in computer readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program instructions 1418.

Some features of the illustrative examples are described in the following clauses. These clauses are examples of features and are not intended to limit other illustrative examples.

Clause 1

A method for automated distribution of aeronautical information, the method comprising:

identifying a source dataset for the aeronautical information, wherein the source dataset is in a common data format and has changes;

identifying a destination dataset for the aeronautical information, wherein the destination dataset is in the common data format;

determining an overlap between the source dataset and the destination dataset;

identifying the changes present in the overlap between the source dataset and the destination dataset;

generating a destination change dataset in a destination format specific to the destination dataset, wherein the destination change dataset comprises the changes present in the overlap; and sending the destination change dataset in the destination format to a destination database storing the destination dataset in the destination format.

Clause 2

The method according to clause 1 further comprising:

updating the destination dataset in the destination database using the destination change dataset in the destination format.

Clause 3

The method according to one of clauses 1 or 2 further comprising:

generating a change report identifying the changes for the destination dataset in the destination database.

Clause 4

The method according to one of clauses 1, 2, or 3, wherein determining the overlap comprises:

determining the overlap between source features in the source dataset and destination features in the destination dataset.

Clause 5

The method according to one of clauses 1, 2, 3, or 4, wherein determining the overlap comprises:

receiving the source dataset in a source format;

converting the source dataset from the source format to the common data format;

converting the destination dataset from the destination format to the common data format; and comparing the source dataset in the common data format to the destination dataset in the common data format to determine the overlap between the source dataset and the destination dataset.

Clause 6

The method according to one of clauses 1, 2, 3, 4, or 5 further comprising:

identifying the changes in the source dataset.

Clause 7

The method according to clause 6, wherein identifying the changes comprises:

creating a source tree for source features in the source dataset in the common data format;

creating a baseline tree for baseline features in a baseline dataset in the common data format;

comparing nodes between the source tree and the baseline tree to form comparison; and determining the changes in the source features in the source dataset and the baseline features in the baseline dataset based on the comparison.

Clause 8

The method according to clause 7, wherein comparing the nodes comprises:

comparing the nodes between the source tree and the baseline tree using a comparison system selected from at least one of a machine learning model, genetic algorithm, and a hash comparison process to form the comparison.

Clause 9

The method according to one of clauses 1, 2, 3, 4, 5, 6, 7, or 8, wherein the common data format is a common extensible markup language schema and the destination format is a destination extensible markup language schema.

Clause 10

The method according to one of clauses 1, 2, 3, 4, 5, 6, 7, 8, or 9, wherein a source format is based on an implementation of a model selected from a group comprising an Aeronautical Information Exchange Model, a Flight Information Exchange Model (FIXM), and an International Civil Aviation Organization Meteorological Information Exchange model (IWXXM).

Clause 11

The method according to one of clauses 1, 2, 3, 4, 5, 6, 7, 8, 9, or 10, wherein the destination database is selected from one of an aviation database, a chart database, a pilot operation manual database, and an airport mapping database.

Clause 12

A change detection system comprising:

a computer system; and a change detector configured to:

identify a source dataset for aeronautical information, wherein the source dataset is in a common data format and has changes;

identify a destination dataset for the aeronautical information, wherein the destination dataset is in the common data format;

determine an overlap between the source dataset and the destination dataset;

identify the changes present in the overlap between the source dataset and the destination dataset;

generate a destination change dataset in a destination format specific to the destination dataset, wherein the destination change dataset comprises the changes present in the overlap; and send the destination change dataset in the destination format to a destination database storing the destination dataset in the destination format.

Clause 13

The change detection system according to clause 12, Wherein the change detector is configured to:

update the destination dataset in the destination database using the destination change dataset in the destination format.

Clause 14

The change detection system according to one of clauses 12 or 13, the change detector is configured to:

generate a change report identifying the changes for the destination dataset in the destination database.

Clause 15

The change detection system according to one of clauses 12, 13 or 14, wherein in determining the overlap, the change detector is configured to:

determine the overlap between source features in the source dataset and destination features in the destination dataset.

Clause 16

The change detection system according to one of clauses 12, 13, 14, or 15, wherein in determining the overlap, the change detector is configured to:

receive the source dataset in a source format;

convert the source dataset from the source format to the common data format;

convert the destination dataset from the destination format to the common data format; and compare the source dataset in the common data format to the destination dataset in the common data format to determine the overlap between the source dataset and the destination dataset.

Clause 17

The change detection system according to one of clauses 12, 13, 14, 15, or 16, wherein the change detector is configured to:

identify the changes in the source dataset.

Clause 18

The change detection system according to clause 17, wherein in identifying the changes, the change detector is configured to:

create a source tree for source features in the source dataset in the common data format;

create a baseline tree for baseline features in a baseline dataset in the common data format;

compare nodes between the source tree and the baseline tree to form comparison; and determine the changes in the source features in the source dataset and the baseline features in the baseline dataset based on the comparison.

Clause 19

The change detection system according to clause 18, wherein in comparing the nodes, the change detector is configured to:

compare the nodes between the source tree and the baseline tree using a comparison system selected from at least one of a machine learning model, genetic algorithm, and a hash comparison process to form the comparison.

Clause 20

The change detection system according to one of clauses 12, 13, 14, 15, 16, 17, 18, or 19 wherein the common data format is a common extensible markup language schema and the destination format is a destination extensible markup language schema.

Clause 21

The change detection system according to one of clauses 12, 13, 14, 15, 16, 17, 18, 19, or 20, wherein a source format is based on an implementation of a model selected from a group comprising an Aeronautical Information Exchange Model, a Flight Information Exchange Model (FIXM), and an International Civil Aviation Organization Meteorological Information Exchange model (IWXXM).

Clause 22

The change detection system according to one of clauses 12, 13, 14, 15, 16, 17, 18, 19, 20, or 21, wherein the destination database is selected from one of an aviation database, a chart database, a pilot operation manual database, and an airport mapping database.

Clause 23

A computer program product for automated distribution of aeronautical information, the computer program product comprising a computer readable storage medium having program instructions embodied therewith, the program instructions executable by a computer system to cause the computer system to:

identify a source dataset for the aeronautical information, wherein the source dataset is in a common data format and has changes;

identify a destination dataset for the aeronautical information, wherein the destination dataset is in the common data format;

determine an overlap between the source dataset and the destination dataset;

identify the changes present in the overlap between the source dataset and the destination dataset;

generate a destination change dataset in a destination format specific to the destination dataset, wherein the destination change dataset comprises the changes present in the overlap; and send the destination change dataset in the destination format to a destination database storing the destination dataset in the destination format.

Thus, illustrative examples provide a method, apparatus, system, and computer program product for managing aeronautical information in datasets. In one illustrative example, a method automatically distributes aeronautical information. A source dataset for the aeronautical information is identified. The source dataset is in a common data format and has changes. A destination dataset for the aeronautical information is identified. The destination dataset is in the common data format. An overlap is determined between the source dataset and the destination dataset. The changes are present in the overlap between the source dataset and the destination dataset. A destination change dataset is generated in a destination format specific to the destination dataset. The destination change dataset comprises the changes present in the overlap. The destination change dataset in the destination format is sent to a destination database storing the destination dataset in the destination format.

As a result, aeronautical information in datasets received from different sources can be automatically processed in real time to identify changes in the new datasets. Further, the illustrative examples can automatically determine in real time what changes are to be propagated or published for destination datasets. This process can include overlaps between the datasets with changes and the destination datasets. Increased efficiency in these comparisons can be formed by converting the datasets into a common data format and creating trees using that common data format. These trees can be placed in memory in a computer system for comparison. Further, the illustrative examples can use comparison systems such as machine learning models, genetic algorithms, and hash comparison processes to increase the speed and accuracy in identifying at least one of changes in a newly received dataset or which changes in a dataset should be sent to a particular destination dataset in which the destination dataset uses a subset of the information in newly received dataset.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for automated distribution of aeronautical information, the method comprising:

identifying a source dataset for the aeronautical information, wherein the source dataset is in a common data format and has changes;

identifying a destination dataset for the aeronautical information, wherein the destination dataset is in the common data format;

determining an overlap between the source dataset and the destination dataset;

identifying the changes present in the overlap between the source dataset and the destination dataset;

identifying the changes in the source dataset, wherein identifying the changes comprises:

creating a source tree for source features in the source dataset in the common data format, creating a baseline tree for baseline features in a baseline dataset in the common data format, comparing nodes between the source tree and the baseline tree to form a comparison, and determining the changes in the source features in the source dataset and the baseline features in the baseline dataset based on the comparison;

generating a destination change dataset in a destination format specific to the destination dataset, wherein the destination change dataset comprises the changes present in the overlap; and sending the destination change dataset in the destination format to a destination database storing the destination dataset in the destination format.

2. The method of claim 1, further comprising:

updating the destination dataset in the destination database using the destination change dataset in the destination format.

3. The method of claim 1, further comprising:

generating a change report identifying the changes for the destination dataset in the destination database.

4. The method of claim 1, wherein determining the overlap comprises:

determining the overlap between source features in the source dataset and destination features in the destination dataset.

5. The method of claim 1, wherein determining the overlap comprises:

receiving the source dataset in a source format;

converting the source dataset from the source format to the common data format;

converting the destination dataset from the destination format to the common data format; and comparing the source dataset in the common data format to the destination dataset in the common data format to determine the overlap between the source dataset and the destination dataset.

6. The method of claim 1, wherein comparing the nodes comprises:

comparing the nodes between the source tree and the baseline tree using a comparison system selected from at least one of a machine learning model, genetic algorithm, and a hash comparison process to form the comparison.

7. The method of claim 1, wherein the common data format is a common extensible markup language schema and the destination format is a destination extensible markup language schema.

8. The method of claim 1, wherein a source format is based on an implementation of a model selected from a group comprising an Aeronautical Information Exchange Model, a Flight Information Exchange Model (FIXM), and an International Civil Aviation Organization Meteorological Information Exchange model (IWXXM).

9. The method of claim 1, wherein the destination database is selected from one of an aviation database, a chart database, a pilot operation manual database, and an airport mapping database.

10. A change detection system comprising:

a computer system; and a change detector configured to:

identify a source dataset for aeronautical information, wherein the source dataset is in a common data format and has changes;

identify a destination dataset for the aeronautical information, wherein the destination dataset is in the common data format;

determine an overlap between the source dataset and the destination dataset;

identify the changes present in the overlap between the source dataset and the destination dataset;

identify the changes in the source dataset, wherein identifying the changes comprises:

creating a source tree for source features in the source dataset in the common data format, creating a baseline tree for baseline features in a baseline dataset in the common data format, comparing nodes between the source tree and the baseline tree to form a comparison, and determining the changes in the source features in the source dataset and the baseline features in the baseline dataset based on the comparison, generate a destination change dataset in a destination format specific to the destination dataset, wherein the destination change dataset comprises the changes present in the overlap; and send the destination change dataset in the destination format to a destination database storing the destination dataset in the destination format.

11. The change detection system of claim 10, Wherein the change detector is configured to:

update the destination dataset in the destination database using the destination change dataset in the destination format.

12. The change detection system of claim 10, the change detector is configured to:

generate a change report identifying the changes for the destination dataset in the destination database.

13. The change detection system of claim 10, wherein in determining the overlap, the change detector is configured to:

determine the overlap between source features in the source dataset and destination features in the destination dataset.

14. The change detection system of claim 10, wherein in determining the overlap, the change detector is configured to:

receive the source dataset in a source format;

convert the source dataset from the source format to the common data format;

convert the destination dataset from the destination format to the common data format; and compare the source dataset in the common data format to the destination dataset in the common data format to determine the overlap between the source dataset and the destination dataset.

15. The change detection system of claim 10, wherein in comparing the nodes, the change detector is configured to:

compare the nodes between the source tree and the baseline tree using a comparison system selected from at least one of a machine learning model, genetic algorithm, and a hash comparison process to form the comparison.

16. The change detection system of claim 10, wherein the common data format is a common extensible markup language schema and the destination format is a destination extensible markup language schema.

17. The change detection system of claim 10, wherein a source format is based on an implementation of a model selected from a group comprising an Aeronautical Information Exchange Model, a Flight Information Exchange Model (FIXM), and an International Civil Aviation Organization Meteorological Information Exchange model (IWXXM).

18. The change detection system of claim 10, wherein the destination database is selected from one of an aviation database, a chart database, a pilot operation manual database, and an airport mapping database.

19. A computer program product for automated distribution of aeronautical information, the computer program product comprising a computer readable storage medium having program instructions embodied therewith, the program instructions executable by a computer system to cause the computer system to:

identify a source dataset for the aeronautical information, wherein the source dataset is in a common data format and has changes;

identify a destination dataset for the aeronautical information, wherein the destination dataset is in the common data format;

determine an overlap between the source dataset and the destination dataset;

identify the changes present in the overlap between the source dataset and the destination dataset;

identify the changes in the source dataset, wherein identifying the changes comprises:

creating a source tree for source features in the source dataset in the common data format, creating a baseline tree for baseline features in a baseline dataset in the common data format, comparing nodes between the source tree and the baseline tree to form a comparison, and determining the changes in the source features in the source dataset and the baseline features in the baseline dataset based on the comparison;

generate a destination change dataset in a destination format specific to the destination dataset, wherein the destination change dataset comprises the changes present in the overlap; and send the destination change dataset in the destination format to a destination database storing the destination dataset in the destination format.

* * * * *